(12) United States Patent
Kang

(10) Patent No.: US 11,383,781 B2
(45) Date of Patent: Jul. 12, 2022

(54) CHILD SEAT FOR RIDING VEHICLES

(71) Applicant: Shenzhen Rider Thinking Technologies CO., LTD., Shenzhen (CN)

(72) Inventor: Zhifeng Kang, Shenzhen (CN)

(73) Assignee: SHENZHEN RIDER THINKING TECHNOLOGIES CO., LTD., Shenzhen (CN)

(*) Notice: Subject to any disclaimer, the term of this patent is extended or adjusted under 35 U.S.C. 154(b) by 296 days.

(21) Appl. No.: 16/639,550

(22) PCT Filed: Aug. 13, 2018

(86) PCT No.: PCT/CN2018/100269
§ 371 (c)(1),
(2) Date: Feb. 14, 2020

(87) PCT Pub. No.: WO2019/034018
PCT Pub. Date: Feb. 21, 2019

(65) Prior Publication Data
US 2020/0277013 A1  Sep. 3, 2020

(30) Foreign Application Priority Data
Aug. 14, 2017 (CN) .......................... 201710691439.7

(51) Int. Cl.
*B62J 1/08* (2006.01)
*B62J 1/16* (2006.01)
(Continued)

(52) U.S. Cl.
CPC . *B62J 1/28* (2013.01); *B62J 1/08* (2013.01); *B62J 1/162* (2013.01); *B60N 2/2806* (2013.01)

(58) Field of Classification Search
CPC ..... B62J 1/28; B62J 1/162; B62J 1/165; B62J 1/167; B62J 1/08; B60N 2/2806
See application file for complete search history.

(56) References Cited

U.S. PATENT DOCUMENTS 4,417,745 A * 11/1983 Shomo ................... B62K 21/12
                                                   280/287
4,969,658 A * 11/1990 Levarek ................... B62J 1/167
                                                   297/243
(Continued)

FOREIGN PATENT DOCUMENTS

CN   202439789 U   9/2012
CN   205706998 U   11/2016
(Continued)

*Primary Examiner* — Tony H Winner
(74) *Attorney, Agent, or Firm* — Muncy, Geissler, Olds & Lowe, P.C.

(57) ABSTRACT

A child seat for riding vehicles comprising a cross beam, a front fork, and a cushion disposed on the cross beam, a foldable armrest being mounted at the connection position between the cross beam and the front fork, a position-adjustable bearing beam which is erected on an oblique vehicle pipe being disposed on the front fork, reversible pedals being disposed at the bottoms of the two side plates of the front fork and an axle connection member connected to a seat pipe of the riding vehicle. The angle between the cross beam and the front fork is adjustable, and the child seat realizes fast and toolless installation and remove.

18 Claims, 8 Drawing Sheets

(51) Int. Cl.
  *B60N 2/28* (2006.01)
  *B62J 1/28* (2006.01)

(56) References Cited

U.S. PATENT DOCUMENTS

| | | | | |
|---|---|---|---|---|
| 5,927,801 A * | 7/1999 | Miree | ............... | B62J 1/167 |
| | | | | 297/195.1 |
| 7,174,852 B2 * | 2/2007 | Jefferson | ............... | B62J 1/167 |
| | | | | 280/304.5 |
| 2002/0100343 A1 * | 8/2002 | Okajima | ............... | B62M 3/08 |
| | | | | 74/594.4 |
| 2005/0082786 A1 * | 4/2005 | Clark | ............... | A63B 22/0046 |
| | | | | 280/294 |
| 2007/0114821 A1 * | 5/2007 | Sosa, III | ............... | B62J 1/167 |
| | | | | 297/195.13 |
| 2017/0129564 A1 * | 5/2017 | Provost | ............... | B62K 19/40 |
| 2017/0217522 A1 * | 8/2017 | Cheng | ............... | B62J 1/167 |

FOREIGN PATENT DOCUMENTS

| | | |
|---|---|---|
| CN | 205819378 U | 12/2016 |
| CN | 107571943 A | 1/2018 |
| CN | 207328669 U | 5/2018 |
| JP | 2002240763 A | 8/2002 |

\* cited by examiner

CHILD SEAT FOR RIDING VEHICLES

CROSS-REFERENCE TO RELATED APPLICATIONS

The present application is a U.S. national phase of International Application No. PCT/CN2018/100269, filed Aug. 14, 2018; and this application claims priority of Application No. 201710691439.7, filed in China on Aug. 14, 2017, the entire contents of all of which are hereby incorporated by reference.

TECHNICAL FIELD

The present invention relates to a child seat for riding vehicles.

BACKGROUND OF THE INVENTION

Nowadays, with the call of the state, people's awareness of environmental protection is getting stronger and stronger, and various low-carbon travel modes are in the ascendant. Bicycle and motorcycle are the main means of transportation for low-carbon travel. Especially, bicycle sharing that has become popular in recent years has promoted the low-carbon travel modes on riding vehicles to a new level.

Bicycle sharing refers to the provision of a bicycle sharing service by an enterprise on a campus, a subway station, a bus stop, a residential area, a commercial area, a public service area, etc., and is a time-sharing rental model. Bicycle sharing is a new type of sharing economy.

In essence, bicycle sharing is a new type of vehicle rental business called bicycle rental business, whose main carrier is a (bicycle) bike. The slump in bicycle travel caused by a city's rapid economic development can be made full used of; the use of public road traffic is maximized. At the same time, the shared bicycle plays the role of making a human body healthy and can be stopped and borrowed whenever necessary, which is very convenient.

Since the end of 2016, bicycle sharing has suddenly become popular in china. On the street, it seems that the shared bicycles have reached the point of "flooding" overnight, and the streets of major cities are lined with the shared bicycles in various colors.

Although the shared bicycle has some conveniences, it is not convenient for people traveling with children. There is no child seat designed and provided, and many people put a child in a basket of the shared bicycle for convenience, which is very dangerous. At the same time, because the shared bicycle is not a rider's own vehicle, the child seat needs to be quickly installed during use, and needs to be quickly dismounted and brought back after use, a child seat product in the prior art generally cannot implement fast toolless installation and dismounting.

In addition to being applicable to the shared bicycle, the present invention is also applicable to a curved beam bicycle and the motorcycle which have adjustable height. Because the seat can be installed and removed quickly without a tool, a user can conveniently install the child seat only when needed. Especially for professional bicycles made of aluminum alloy, titanium alloy or carbon material that persuit light weight, the significance is obvious.

SUMMARY OF THE INVENTION

The object of the present invention is to provide a child seat for riding vehicles which is convenient to carry and has good versatility.

The object of the present invention can be achieved by the following technical solution:

A child seat for a riding vehicle, comprising a cross beam, a front fork, and a cushion disposed on the cross beam, the connection angle between the cross beam and the front fork is adjustable, and the cross beam and the front fork are fixedly connected by means of a limiting mechanism after the connection angle is determined, a foldable armrest is mounted at a connection position between the cross beam and the front fork, and the armrest and the cross beam are fixed by means of the limiting mechanism after the relative position therebetween is determined, a position-adjustable bearing beam is disposed on the front fork, and the bearing beam is erected on an oblique vehicle pipe of the riding vehicle, reversible pedals are disposed at the bottoms of the two side plates of the front fork, an axle connection member connected to a seat pipe of the riding vehicle is disposed at the rear end of the cross beam and comprises a pipe clamp buckled on the seat pipe, and the opening end of the pipe clamp is fastened and fixed by a handle locking member, the handle locking member comprises a first handle and a first pin shaft hingedly connected to the first handle, a first locking nut capable of adjusting the gap of the opening end is disposed on the outer end of the first pin shaft, the first locking nut comprises a nut cap and a spherical nut body, and the spherical nut body and a spherical through hole in the pipe clamp cooperate to fix the first pin shaft. The present invention is a foldable structure, when not in use, the seat can be folded into a small space, which is convenient to carry, meanwhile, the seat is connected and fixed to the riding vehicle via the pipe clamp, no tools are required, disassembly is fast and convenient, further, the first pin shaft is positioned by a spherical structure, which can accommodate different sizes of the seat pipes.

Further, the pipe clamp comprises a first clamp plate and a second clamp plate, one end of the first clamp plate and one end of the second clamp plate are hinged, the free end of the second clamp plate is opened with a notch in which the first pin shaft adjusts the installation position thereof along movement, a positioning piece coordinating with the outer surface of the free end of the second clamp plate to determine the position of the first pin shaft is disposed on a hinged end of the first pin shaft. When the openings of the first clamp plate and the second clamp plate are trumpet-shaped structures, the inclination degree of the first pin shaft is determined by the positioning piece, and then the inclination degree of the first pin shaft is adapted by the spherical structure of the first locking nut.

Further, the first clamp plate and the second clamp plate are both provided with an arc portion that fits the seat pipe, and the arc portion is formed by a plurality of arcs with different diameters that is smoothly connected so that the pipe clamp can fit the seat pipes in different sizes, whose use range is wide.

Further, the limiting mechanism comprises a second handle and a second pin shaft hinged on the second handle, two side plates of the front fork and a plurality of metal connection members are disposed on and passed through by the second pin shaft, the metal connection member is arranged between the two side plates and are fixedly connected to the cross beam and the armrest, respectively, and the outer end of the second pin shaft is provided with a second locking nut preventing the components thereabove from falling; both sides of the metal connection member and the inner top of the two side plates are all provided with a gear structure, the adjacent metal connection members, the adjacent metal connection members and side plates are meshed and positioned with each other via the gears and fastened and fixed via the handle. The limiting mechanism is positioned and limited via the gear structure, which is safe and reliable, the limiting mechanism is opened and fastened by the handle, which is quick and convenient to use.

Further, a tower-type spring for driving the gears to mesh and separate away is arranged inside and between the adjacent metal connection members, as well as inside and between the adjacent metal connection member and side plate.

Further, the cushion comprises a cushion body and two wings overhanging the cross beam, and the wings that can be folded to the surface of the cushion body are connected to the cushion body. When not in use, the wings are folded toward the surface of the cushion body, and the folded wings are fixed by the folded armrests to reduce the size of the folded seat, which is convenient for carrying around.

Further, the armrest is a chamfered rectangular structure, and the outer surface of the armrest is covered with a sponge layer, which is first for the child to hold the hands thereof, and is second to protect the child from being rushed forward and colliding with a vehicle faucet during a sudden brake, meanwhile, due to the cushion of a sponge, an impact force is reduced.

Further, the tread surfaces of the pedals can be rotated forward relative to a horizontal surface, and the tread surfaces is provided thereon with an arc surface. When the child steps on the pedals, the feet of the child are in surface contact with the tread surface, not in an edge surface with the tread surface, so that the child can use the pedal comfortably.

Further, the side plates of the front fork are provided thereon with slide rails in which the bearing beam is moved along sliding and multi-stage tooth openings for limiting the bearing beam, the slide rail is in communication with the multi-stage tooth opening. There are many types of riding vehicles with different sizes, so the position of the bearing beam can be adjusted, so that the seat can adapt to riding vehicles in different sizes.

Further, the bearing beam is formed by the smooth connection of a plurality of arc pipes. The bearing beam of an arc structure can cooperate well with an oblique vehicle pipe of the riding vehicle, which will not cause the seat to slide left and right, thereby preventing the wear on a plurality of the oblique vehicle pipes and the seat.

The beneficial effect of the present invention is that the entire seat is small and light after being folded, which is convenient to carry, is quick and convenient to disassemble, and is safe and reliable to use.

BRIEF DESCRIPTION OF THE DRAWINGS

The specific embodiments of the present invention will be further described in details with reference to the accompanying drawings, in which.

DETAILED DESCRIPTION OF THE INVENTION

The following were specific embodiments of the present invention in combination with the drawings to further describe the technical solution of the present invention, but the present invention was not limited to these embodiments.

Figure 1:
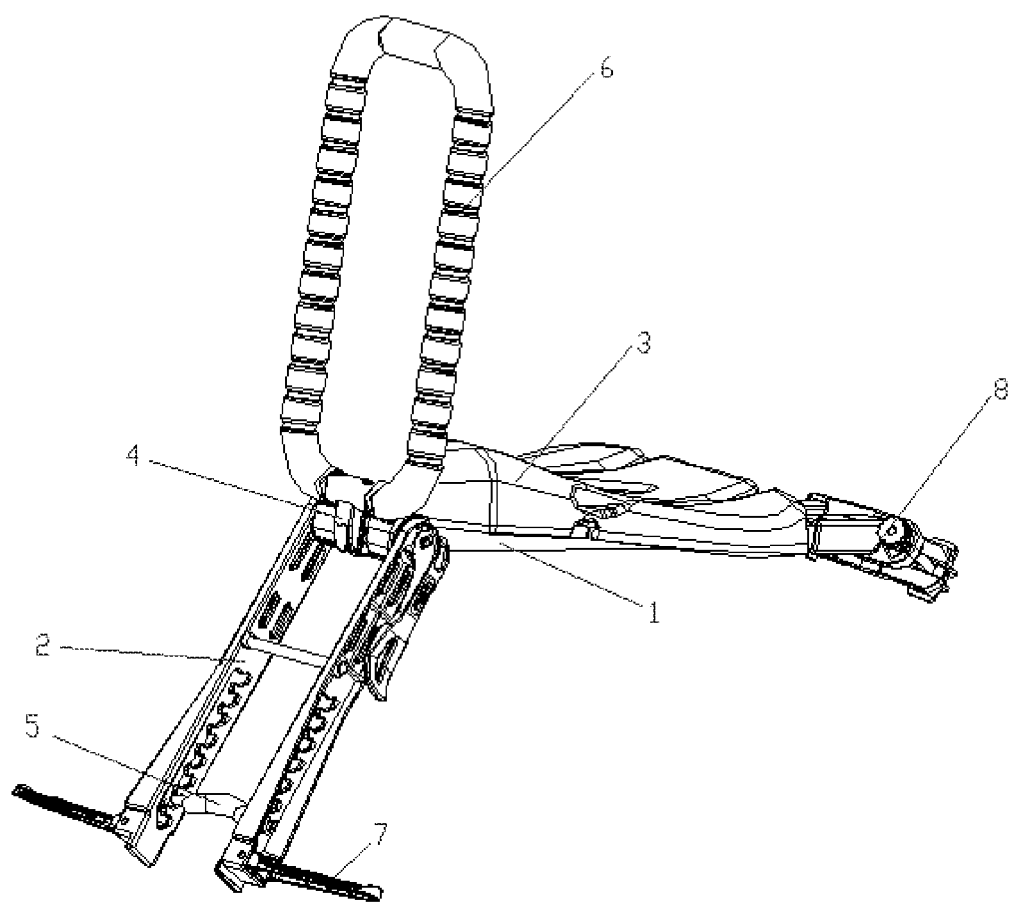
FIG. 1 is a structural diagram of a child seat of a riding vehicle in use in a preferred embodiment of the present invention.
Figure 2:
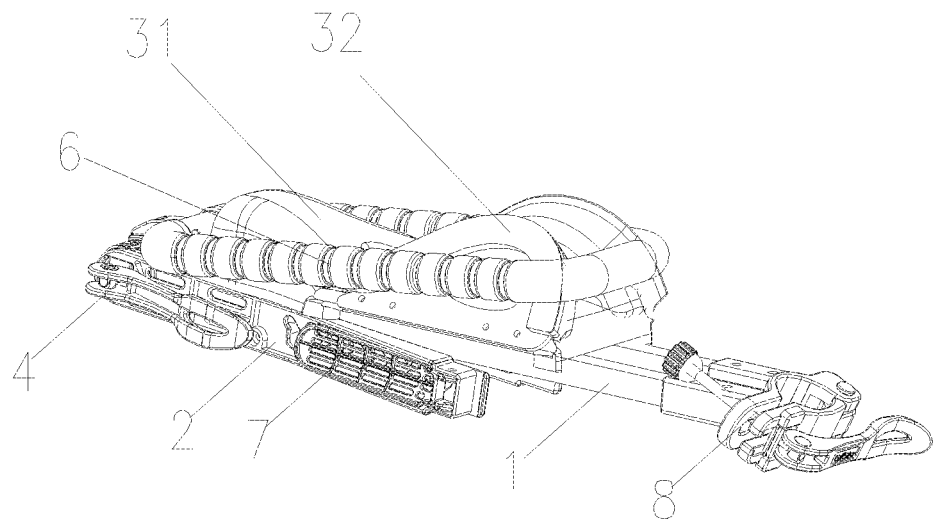
FIG. 2 is a diagram of a folding structure of a child seat of a riding vehicle in a preferred embodiment of the present invention.
Figure 3:
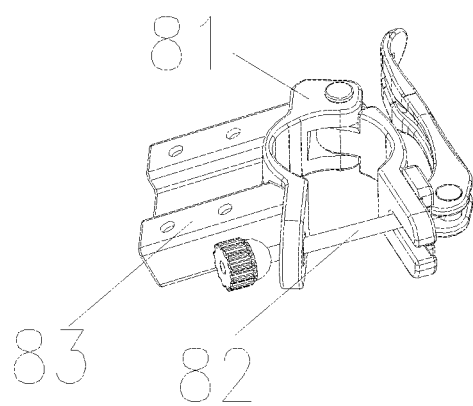
FIG. 3 is a diagram of a fastening structure of an axle connection member in a preferred embodiment of the present invention.
Figure 4:
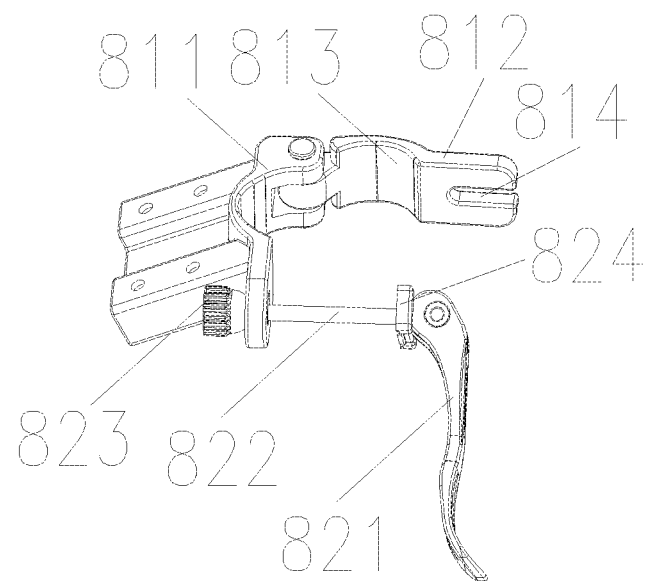
FIG. 4 is a diagram of an opened structure of an axle connection member in a preferred embodiment of the present invention.

Referring to FIG. 1 and FIG. 2, a child seat of a riding vehicle comprised a cross beam 1, a front fork 2, and a cushion 3 disposed on the cross beam 1, a connection angle between the cross beam 1 and the front fork 2 was adjustable, and the cross beam 1 and the front fork 2 were fixedly connected by means of a limiting mechanism 4 after the angle was determined; a foldable armrest 6 was mounted at a connection position between the cross beam 1 and the front fork 2, and the armrest 6 and the cross beam 1 were fixed by means of the limiting mechanism 4 after the relative position therebetween was determined; a position-adjustable bearing beam 5 was disposed on the front fork 2, and the bearing beam 5 was erected on an oblique vehicle pipe of the riding vehicle; reversible pedals 7 were disposed at the bottoms of the two side plates 21 of the front fork 2, an axle connection member 8 connected to a seat pipe of the riding vehicle was disposed at the rear end of the cross beam 1. The cushion comprised a cushion body 31 and two wings 32 overhanging the cross beam 1, the wings 32 that could be folded to the surface of the cushion body 31 were connected to the cushion body 31. The wings were folded to the cushion body 31 when not in use, and the folded wings 31 were fixed by means of the folded armrest 6, see FIG. 2, and the size of the seat after folding was reduced, which was convenient for carrying around. The present invention was overall a foldable structure, the armrest 6 and the front fork 2 were both rotatable relative to the cross beam 1, when not in use, the armrest 6, the front fork 2, and the cross beam 1 could be folded together, which could reduce the overall space occupied by the seat for easy carrying in a bag.

The armrest 6 in this embodiment was a chamfered rectangular structure, the outer surface of the armrest 6 was covered with a sponge layer, which was first for the child to hold the hands thereof, and was second to protect the child from being rushed forward and colliding with a vehicle faucet during a sudden brake, meanwhile, due to the cushion of a sponge, an impact force was reduced. After the armrest 6 was folded, an angle between the armrest 6 and the cross beam 1 was slightly larger than a right angle. The connection angle between the cross beam 1 and the front fork 2 was preferably 135°, and the seat did not slide down under the action of gravity, making it safer to use.

Figure 5:
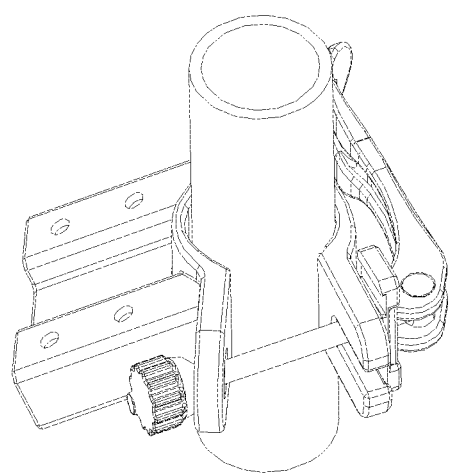
FIG. 5 is a structural diagram of an axle connection member cooperating with a large-sized seat pipe in a preferred embodiment of the present invention.
Figure 6:
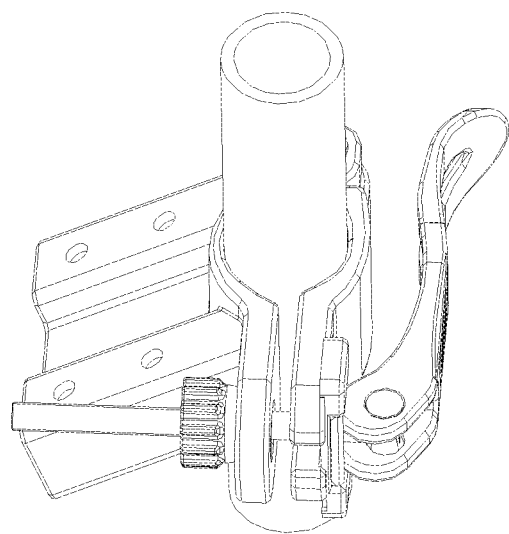
FIG. 6 is a structural diagram of an axle connection member cooperating with a small-sized seat pipe in a preferred embodiment of the present invention.

Referring to FIGS. 3-6, the axle connection member 8 according to this embodiment comprised a connection portion 83 connected to the cross beam 1 and a pipe clamp 81 fastened to the seat pipe, the opening end of the pipe clamp 81 was fastened and fixed by a handle locking member 82. The handle locking member 82 comprised a first handle 821 and a first pin shaft 822 hinged on the first handle 821, the outer end of the first pin shaft 822 was provided with a first locking nut 823 capable of adjusting the distance between the opening ends, the first locking nut 823 comprised a nut cap and a spherical nut body, the spherical nut body cooperated with a spherical through hole on the pipe clamp 81 to position the first pin shaft 822. The pipe clamp 81 comprised a first clamp plate 811 and a second clamp plate 812, one end of the first clamp plate and one end of the second clamp plate were hinged, the first clamp plate 811 and the connection portion 83 were an integrated structure, the free end of the second clamp plate 812 was opened with a notch 814 through which the first pin shaft 822 moved and adjusted the installation position, a hinged end of the first pin shaft 822 was provided thereon with a positioning piece 824 that cooperated with the outer surface of the free end of the second clamp plate 812 to determine the position of the first pin shaft 822, the first clamp plate 811 and the second clamp plate 812 were both provided thereon with an arc portion 813 that fits the seat pipe, and the arc portion 813 was formed by a plurality of arcs with different diameters that was smoothly connected, so that the pipe clamp 81 could fit together with the seat pipes in different sizes, as shown in FIGS. 5 and 6, with a wide range of use. When the openings of the first clamp plate 811 and the second clamp plate 812 were trumpet-shaped structures, the inclination of the first pin shaft 822 was positioned by the positioning piece 824, and then the inclination of the first pin shaft 822 was adapted via spherical structure of the first locking nut 823 and a spherical through hole of the first clamp plate 811. The seat was connected and fixed with the riding vehicle via the pipe clamp 81, and the installation could be achieved by only tightening the first handle 821, and the disassembly could be achieved by releasing the first handle 822, it can be seen that no tools are needed, and the disassembly is fast and convenient, further, the first pin shaft 822 was positioned via the spherical structure and the positioning piece 824, which could be adapted to seat pipes in different sizes, see FIGS. 5 and 6.

Figure 7:
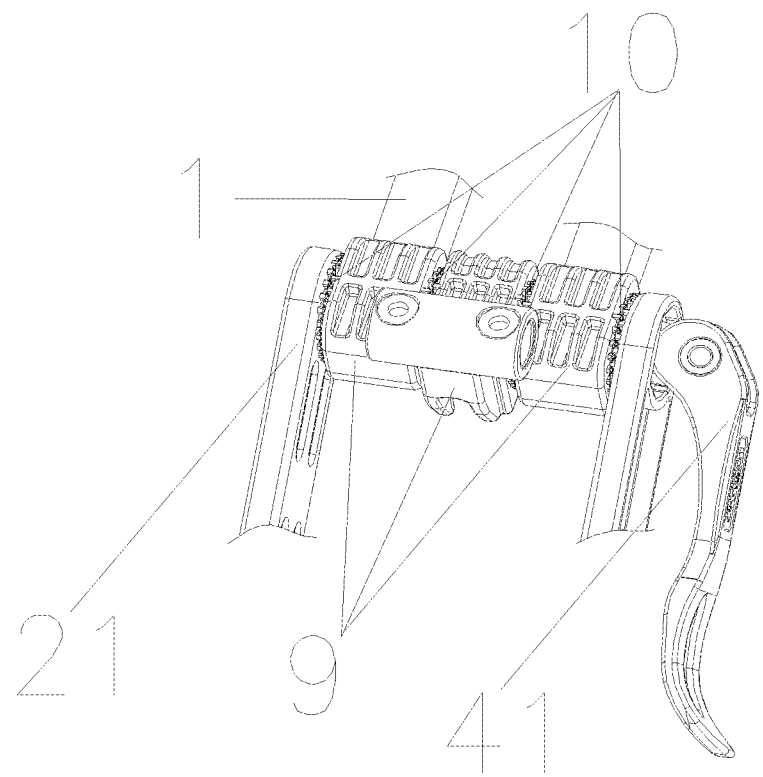
FIG. 7 is a diagram of a fastening structure of a limiting mechanism in a preferred embodiment of the present invention.
Figure 8:
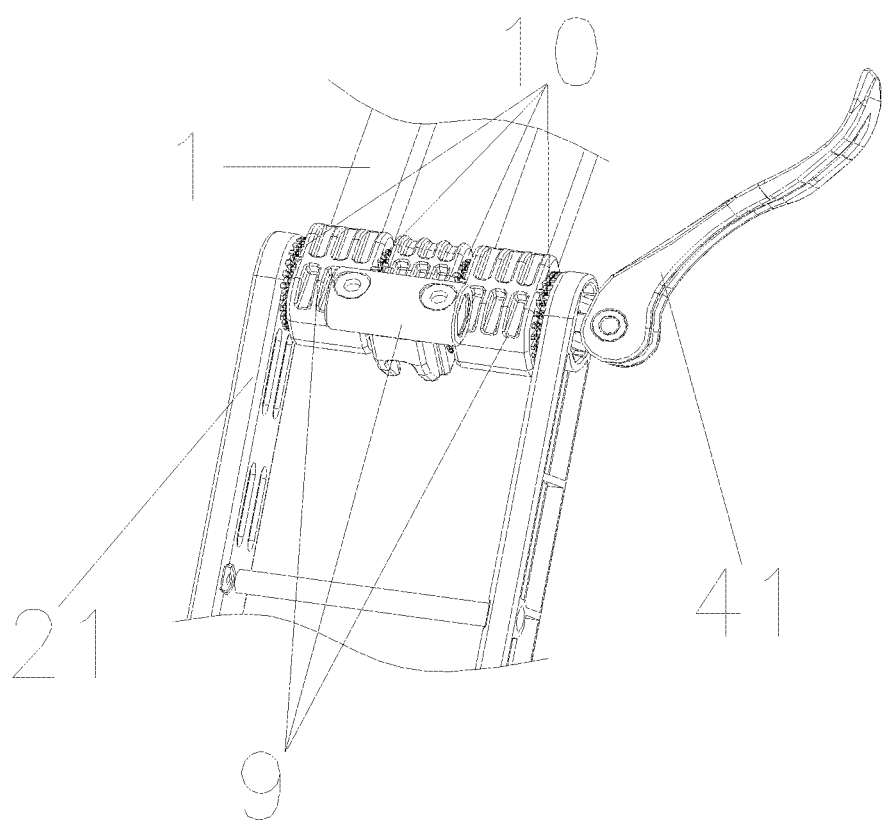
FIG. 8 is a diagram of an opening structure of a limiting mechanism in a preferred embodiment of the present invention.
Figure 9:
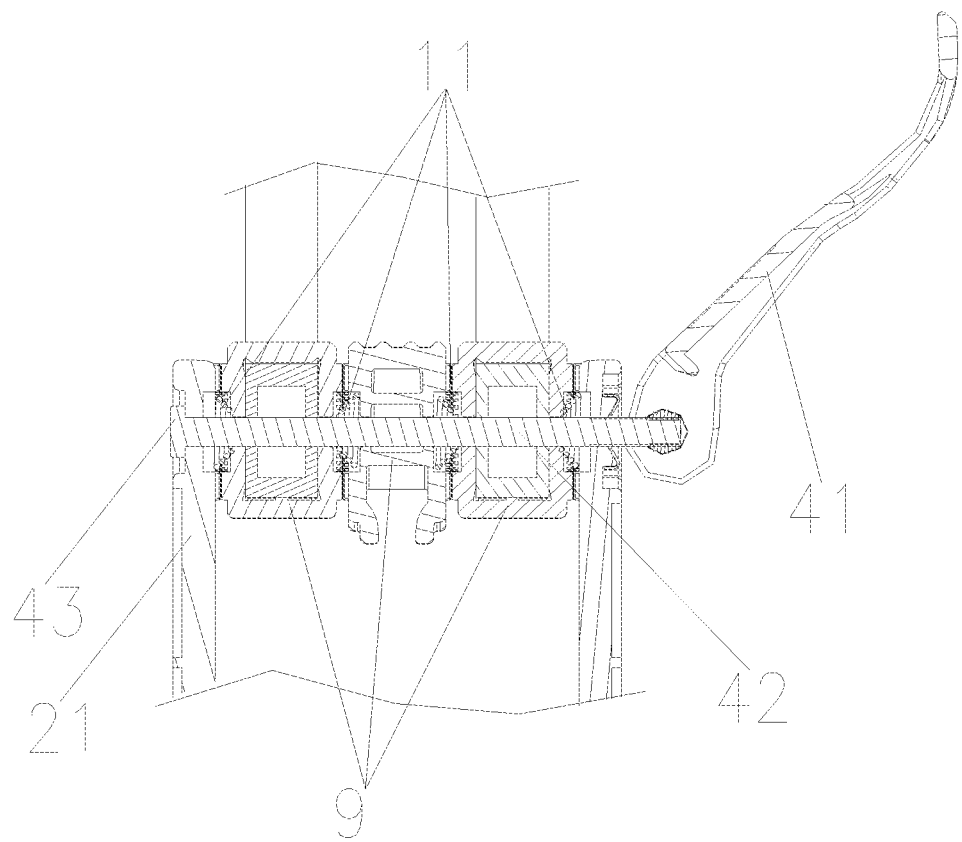
FIG. 9 is a sectional structure diagram of a limiting mechanism in a preferred embodiment of the present invention.

Referring to FIGS. 7-9, the limiting mechanism 4 according to this embodiment comprised a second handle 41 and a second pin 42 hinged on the second handle 41, two side plates 21 of the front fork 2 and a plurality of metal connection members 9 were disposed on and passed through by the second pin shaft 42, the metal connection member was arranged between the two side plates 21 and were fixedly connected to the cross beam 1 and the armrest 6, respectively, the outer end of the second pin shaft 42 was provided with a second locking nut 43 preventing the components thereabove from falling; both sides of the metal connection member 9 and the inner top of the two side plates 21 were all provided with a gear structure 10, the adjacent metal connection members 9 the adjacent metal connection member 9 and the side plate 21 were meshed and positioned with each other via the gear and fastened and fixed via the second handle 41. The limiting mechanism 4 was positioned and limited by the gears 10, which was safe and reliable, the limiting mechanism 4 was opened and fastened by the second handle 41, which was quick and convenient to use. A tower-type spring 11 for driving the gear to mesh and separate away was arranged inside and between the adjacent metal connection members 9, as well as inside and between the adjacent metal connection member 9 and side plate 21.

Figure 10:
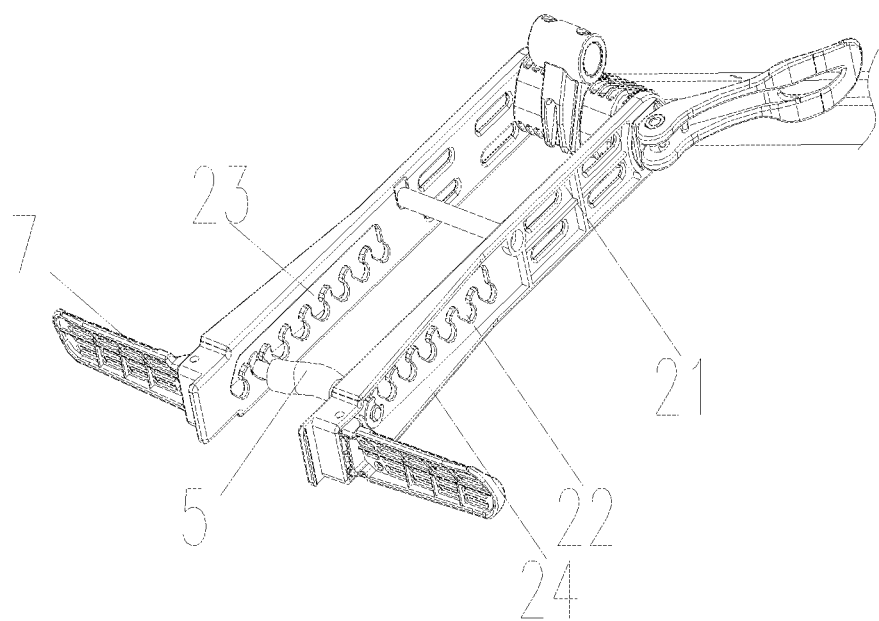
FIG. 10 is a structural diagram of a front fork in a preferred embodiment of the present invention.
Figure 11:
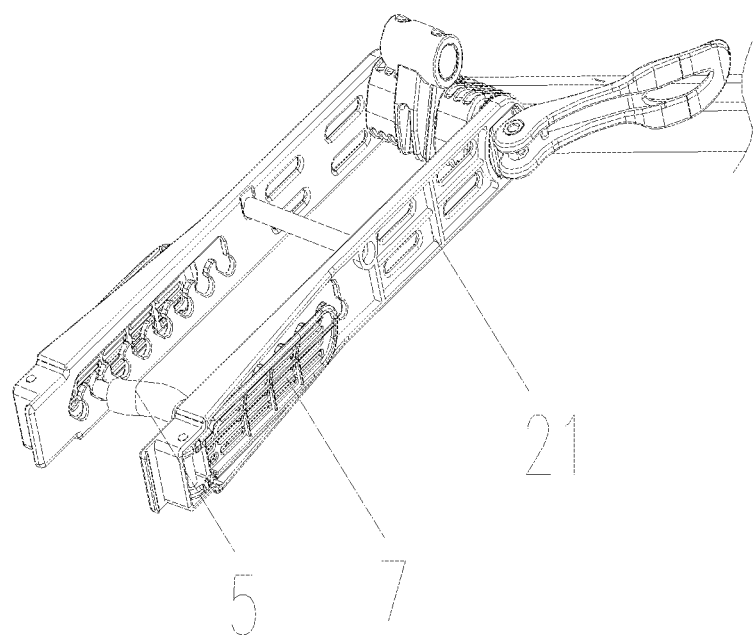
FIG. 11 is a structural diagram of folded pedals in a preferred embodiment of the present invention.
Figure 12:
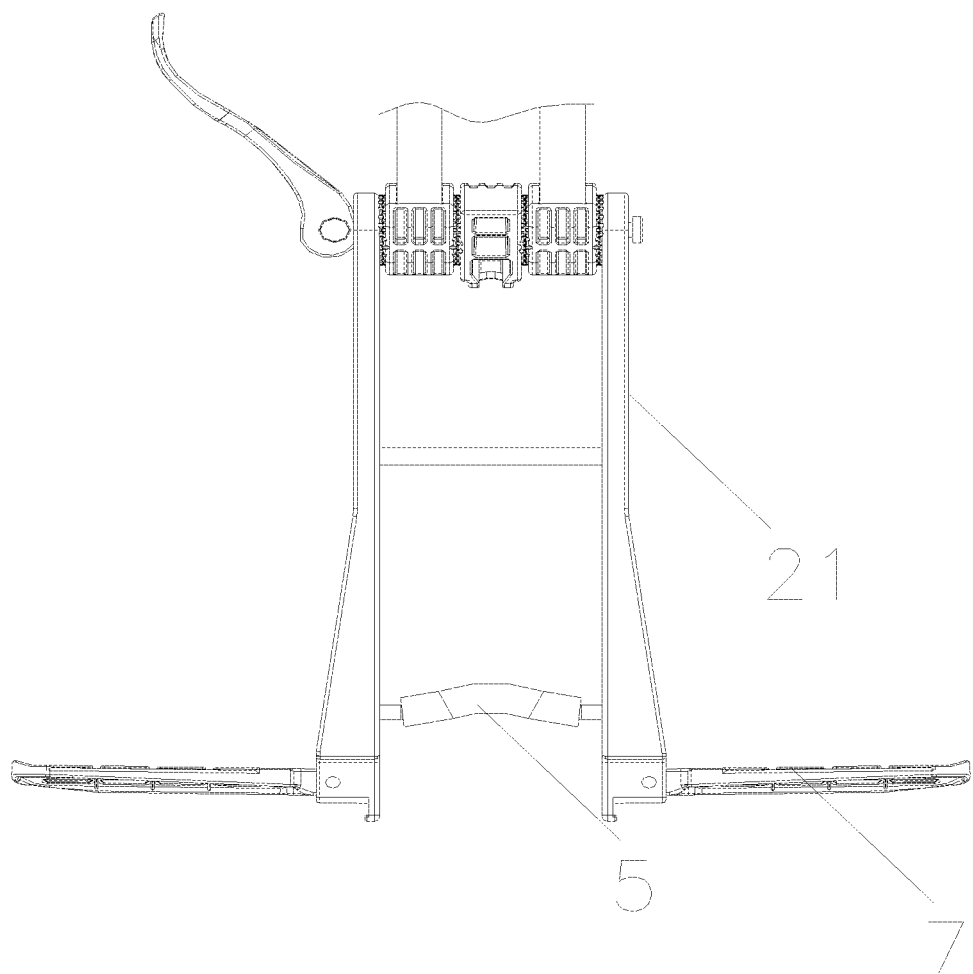
FIG. 12 is a structural diagram of unfolded pedals in a preferred embodiment of the present invention.

Referring to FIGS. 10-12, the two side plates 21 of the front fork 2 according to this embodiment were provided thereon with slide rails in which the bearing beam 5 was moved along sliding and multi-stage tooth openings 22 for limiting the bearing beam 5, the slide rail 23 was in communication with the multi-stage tooth opening 22. There were many types of riding vehicles and the sizes thereof were different, therefore, the position of the bearing beam 5 was adjustable, so that the seat could be adapted to the riding vehicles in different sizes. The bearing beam 5 was formed by the smooth connection of a plurality of arc pipes. The bearing beam 5 of an arc structure could cooperate well with an oblique vehicle pipe of the riding vehicle, which would not cause the seat to slide left and right, thereby preventing the wear on a plurality of the oblique vehicle pipes and the seat. A receiving portion 24 for receiving the pedals 7 was disposed on the outer surfaces of the two side plates 21 of the front fork 2. When the pedals 7 were not in use, the pedals could be reversed and be folded inside the receiving portion 24, which reduced the space occupied by the seat.

In this embodiment, the tread surface of the pedals 7 could be rotated forward relative to a horizontal surface, as shown in FIG. 12, the tread surface is provided with an arc surface. When the child steps on the pedals, the feet of the child were in surface contact with the tread surface, not in an edge surface with the tread surface, so that the child could use the pedal comfortably.

In this embodiment, the cross beam 1, the front fork 2, the armrest 6, the pedals 7, the bearing beam 5, and the axle connection member 8 were all made of aluminum alloy materials or engineering plastics, making the entire seat light and convenient to carry.

During the installation of the present invention, after the armrest 6 and the front fork 2 were rotated relative to the cross beam 1 by a certain angle, the second handle 41 was fastened to position the armrest 6, the front fork 2 and the cross beam 1, meanwhile, the wings 32 on the cushion were unfolded and fixed, then the handle locking member 82 on the pipe clamp 81 was opened, the pipe clamp 81 is sleeved on the seat pipe, the size of the seat pipe was selected to be the same as the size of the arc portion 813 according to the size of the seat pipe, so that the pipe clamp 81 fitted the seat pipe, then the first pin shaft 822 was inserted into the notch 814, the positioning piece 824 slides along the outer surface of the free end of the second clamp plate 812 to a reasonable position, and the first lock nut 823 was tightened to adjust the distance between the first clamp plate 811 and the second clamp plate 812 so that the first clamp plate 811 and the second clamp plate 12 fitted completely the seat pipe, then the first handle 821 was fastened, the cross beam 1 and the seat pipe were connected completely, and then the position of the bearing beam 5 could be adjusted according to the distance between the oblique pipe of the riding vehicle and the seat pipe to complete the seat installation. Then the pedals 7 were reversed out and rotated forward by a certain angle, so the child could sit on the cushion 3, and the hands of the child could be held on the armrest 6, and the feet of the child could step on the tread of the pedals 7.

When disassembled, the first handle 821 was released, the first pin shaft 822 was taken out from the notch 814, and then the seat could be taken down, and then all foldable parts that could be folded on the seat were folded and carried around.

The specific embodiments described herein were merely illustrative of the spirit of the present invention. A person skilled in the art to which the present invention pertains might make various modifications or additions to the specific embodiments described or replace the specific embodiments described in a similar manner, but would not depart from the spirit of the present invention or exceed the range defined by the appended claims.

The invention claimed is:

1. A child seat for a riding vehicle, comprising:
a cross beam, a front fork, and a cushion disposed on the cross beam, wherein a connection angle between the cross beam and the front fork is adjustable, and the cross beam and the front fork are fixedly connected by means of a limiting mechanism after the connection angle is determined;
a foldable armrest being mounted at the connection position between the cross beam and the front fork, wherein the armrest and the cross beam are fixed by the limiting mechanism after the relative position therebetween is determined;
a position-adjustable bearing beam being disposed on the front fork, wherein the bearing beam is erected on an oblique vehicle pipe of the riding vehicle;
reversible pedals being disposed at the bottoms of the two side plates of the front fork;
an axle connection member connected to a seat pipe of the riding vehicle, wherein the axle connection member is disposed at a rear end of the cross beam and comprises a pipe clamp buckled on the seat pipe; wherein
an opening end of the pipe clamp is fastened and fixed by a handle locking member; wherein the handle locking member comprises a first handle and a first pin shaft hingedly connected to the first handle; wherein
a first locking nut capable of adjusting a gap of an opening end is disposed on an outer end of the first pin shaft; wherein
the first locking nut comprises a nut cap and a spherical nut body, and the spherical nut body and a spherical through hole in the pipe clamp cooperate to fix the first pin shaft.

2. The child seat for the riding vehicle according to claim 1, wherein the pipe clamp comprises a first clamp plate and a second clamp plate, one end of the first clamp plate and one end of the second clamp plate are hinged, a free end of the second clamp plate is opened with a notch through which the first pin shaft moves and adjusts the installation position, a positioning piece coordinating with the outer surface of the free end of the second clamp plate to determine the position of the first pin shaft is disposed on a hinged end of the first pin shaft.

3. The child seat for the riding vehicle according to claim 2, wherein the first clamp plate and the second clamp plate are both provided with an arc portion that fits the seat pipe, and the arc portion is formed by a plurality of arcs with different diameters that is smoothly connected.

4. The child seat for the riding vehicle according to claim 2, wherein the armrest is a chamfered rectangular structure, and an outer surface of the armrest is covered with a sponge layer.

5. The child seat for the riding vehicle according to claim 4, wherein the tread surfaces of the pedals can be rotated forward relative to a horizontal surface, and the tread surfaces is provided thereon with an arc surface.

6. The child seat for the riding vehicle according to claim 5, wherein each of the side plates of the front fork is provided thereon with a slide rail in which the bearing beam is moved along sliding and a multi-stage tooth opening for limiting the bearing beam; the slide rail is in communication with the multi-stage tooth opening.

7. The child seat for the riding vehicle according to claim 6, wherein the bearing beam is formed by a smooth connection of a plurality of arc pipes.

8. The child seat for the riding vehicle according to claim 1, wherein the limiting mechanism comprises a second handle and a second pin shaft hinged on the second handle;
two side plates of the front fork and a plurality of metal connection members are disposed on and passed through by the second pin shaft;
the plurality of metal connection member is arranged between the two side plates and are fixedly connected to the cross beam and the armrest, respectively, and an outer end of the second pin shaft is provided with a second locking nut preventing the components thereabove from falling;
both sides of the metal connection members and the inner top of the two side plates are all provided with a gear;
the adjacent metal connection members and side plates are meshed and positioned with each other via the gears and fastened and fixed via the second handle.

9. The child seat for the riding vehicle according to claim 8, wherein a tower spring for driving the gears to mesh and separate away is arranged between and inside the adjacent metal connection members, as well as between and inside the adjacent metal connection member and the side plate.

10. The child seat for the riding vehicle according to claim 8, wherein the armrest is a chamfered rectangular structure, and an outer surface of the armrest is covered with a sponge layer.

11. The child seat for the riding vehicle according to claim 10, wherein the tread surfaces of the pedals can be rotated forward relative to a horizontal surface, and the tread surfaces is provided thereon with an arc surface.

12. The child seat for the riding vehicle according to claim 11, wherein each of the side plates of the front fork is provided thereon with a slide rail in which the bearing beam is moved along sliding and a multi-stage tooth opening for limiting the bearing beam; the slide rail is in communication with the multi-stage tooth opening.

13. The child seat for the riding vehicle according to claim 12, wherein the bearing beam is formed by a smooth connection of a plurality of arc pipes.

14. The child seat for the riding vehicle according to claim 1, wherein a cushion comprises a cushion body and two wings overhang the cross beam, and the wings that can be folded to a surface of the cushion body are connected to the cushion body.

15. The child seat for the riding vehicle according to claim 1, wherein the armrest is a chamfered rectangular structure, and outer surface of the armrest is covered with a sponge layer.

16. The child seat for the riding vehicle according to claim 15, wherein the tread surfaces of the pedals can be rotated forward relative to a horizontal surface, and the tread surfaces is provided thereon with an arc surface.

17. The child seat for the riding vehicle according to claim 16, wherein each of the side plates of the front fork is provided thereon with a slide rail in which the bearing beam is moved along sliding and a multi-stage tooth opening for limiting the bearing beam; the slide rail is in communication with the multi-stage tooth opening.

18. The child seat for the riding vehicle according to claim 17, wherein the bearing beam is formed by a smooth connection of a plurality of arc pipes.

\* \* \* \* \*